(12) United States Patent
Goto et al.

(10) Patent No.: US 6,659,509 B2
(45) Date of Patent: Dec. 9, 2003

(54) THREADED JOINT FOR STEEL PIPES

(75) Inventors: Kunio Goto, Kobe (JP); Keishi Matsumoto, Takarazuka (JP); Kazuyuki Nakasuji, Nishinomiya (JP); Toshiro Anraku, Nishinomiya (JP); Shigeo Nagasaku, Nishinomiya (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 10/361,763

(22) Filed: Feb. 11, 2003

(65) Prior Publication Data

US 2003/0160446 A1 Aug. 28, 2003

Related U.S. Application Data

(63) Continuation of application No. PCT/JP02/03587, filed on Apr. 11, 2002.

(30) Foreign Application Priority Data

Apr. 11, 2001 (JP) .......................................... 2001-112883
May 24, 2001 (JP) .......................................... 2001-155795

(51) Int. Cl.⁷ ................................................. F16L 15/04
(52) U.S. Cl. ........................... 285/94; 285/333; 285/390
(58) Field of Search ................................. 285/333, 334, 285/390, 55, 94

(56) References Cited

U.S. PATENT DOCUMENTS

| | | | |
|---|---|---|---|
| 3,996,398 A | * 12/1976 | Manfredi | 427/451 |
| 4,468,309 A | * 8/1984 | White | 427/528 |
| 4,474,651 A | * 10/1984 | Yauchi et al. | 385/329 |
| 4,630,849 A | * 12/1986 | Fukui et al. | 285/55 |
| 4,758,025 A | * 7/1988 | Frick | 285/55 |
| 4,871,194 A | * 10/1989 | Kawashima et al. | 285/55 |
| 5,064,224 A | * 11/1991 | Tai | 285/94 |
| 5,253,902 A | * 10/1993 | Petelot et al. | 285/94 |
| 5,427,418 A | * 6/1995 | Watts | 285/94 |
| 5,678,608 A | * 10/1997 | Fontana | 138/96 T |
| 6,027,145 A | * 2/2000 | Tsuru et al. | 285/94 |
| 6,394,190 B2 | * 5/2002 | Linden | 173/1 |

FOREIGN PATENT DOCUMENTS

| | | | |
|---|---|---|---|
| JP | 61-136087 | | 6/1986 |
| JP | 1-219173 | | 9/1989 |
| JP | 05-059387 | | 3/1993 |
| JP | 4319644 | * | 6/1994 |
| JP | 6-228583 | | 8/1994 |
| JP | 08-103724 | | 4/1996 |
| JP | 08-233163 | | 9/1996 |
| JP | 08-233164 | | 9/1996 |
| JP | 09-072467 | | 3/1997 |
| JP | 2001-065753 | | 3/2001 |
| JP | 2001 125294 | * | 5/2001 |
| JP | 2003 352953 | * | 5/2002 |

\* cited by examiner

*Primary Examiner*—Eric K. Nicholson
(74) *Attorney, Agent, or Firm*—Clark & Brody

(57) ABSTRACT

This invention relates to a threaded joint for steel pipes which comprises a pin and a box each having a contact surface including a threaded portion and an unthreaded metal contact portion and which guarantees galling resistance and gas tightness in a stable manner without application of a compound grease. A solid lubricating coating comprising a lubricating powder (e.g., molybdenum disulfide) and an organic or inorganic binder is formed on the contact surface of at least one of the pin and the box. The proportion of area of a cross section along the thickness of the solid lubricating coating which is occupied by secondary particles of the lubricating powder having an equivalent circular diameter of 15–60 μm is from 5–90%. Alternatively, the solid lubricating coating comprises, in addition to the lubricating powder, a fibrous filler (e.g., inorganic whiskers) in such an amount that the mass ratio of the fibrous filler to the binder is 0.01–0.5. As a result, galling resistance is improved, particularly at high temperatures.

13 Claims, 2 Drawing Sheets

THREADED JOINT FOR STEEL PIPES

This application is a continuation of International Patent Application No. PCT/JP02/03587, filed Apr. 11, 2002. This PCT application was not in English as published under PCT Article 21(2).

TECHNICAL FIELD

This invention relates to a threaded joint for steel pipes for use in connecting steel pipes such as oil well pipes. More particularly, this invention relates to a threaded joint for steel pipes which has excellent galling resistance and gas tightness and which does not require the application of a compound grease containing a heavy metal powder, which application was conventionally carried out before each time fastening was performed in order to prevent the joint from galling.

BACKGROUND ART

Oil well pipes which are steel pipes used in the drilling of oil wells are connected with each other by a threaded joint for steel pipes. The threaded joint is comprised of a pin having a male thread and a box having a female thread.

As schematically shown in FIG. 1, a male thread 3A is normally formed on the outer surface at both ends of a steel pipe A to form a pin 1, and a female thread 3B is formed on both sides of the inner surface of a separate joint member in the form of a sleeve-shaped coupling B to form a box 2. As shown in FIG. 1, the steel pipe A is normally shipped in a state in which a coupling B is previously connected to one end.

A threaded joint for steel pipes is subjected to compound pressures due to axial tensile forces caused by the weight of the steel pipe and the coupling and internal and external pressures underground, and it is also subjected to heat underground. Therefore, a threaded joint is required to maintain gas tightness (sealability) without being damaged even under such conditions. In addition, during the process of lowering oil well pipes, it is often the case that a joint which has once been fastened is loosened (unfastened) and then refastened. Therefore, according to API (American Petroleum Institute), it is desired that there be no occurrence of severe seizing called galling and that gas tightness be maintained even if fastening (make-up) and loosening (break-out) are carried out ten times for joints for tubing and three times for joints for casing.

In recent years, in order to improve gas tightness, special threaded joints which are capable of forming a metal-to-metal seal have come to be generally used. In this type of threaded joint, each of a pin and a box has an unthreaded metal contact portion in addition to a threaded portion having a male or female thread, and both the threaded portion and the unthreaded metal contact portion form a contact surface between the pin and box. The unthreaded metal contact portions of the pin and the box come into intimate contact with each other to form a metal-to-metal seal portion and contribute to an increase in gas tightness.

In such a threaded joint capable of forming a metal-to-metal seal, a lubricating grease with high lubricity called a compound grease has been used in order to prevent the contact surface, particularly the metal contact surface, from galling. This grease, which is a kind of liquid lubricant, is applied to the contact surface of at least one of the pin and the box prior to fastening. However, this grease contains a large amount of harmful heavy metal powders. When the grease which is squeezed out to the periphery during fastening is cleaned with a cleaning agent, the compound grease and the used cleaning agent flow out into the ocean or the soil and cause environmental pollution, and this has come to be considered a problem. In addition, there was the problem that the application of grease and cleaning which were repeated before each fastening lowered the working efficiency in the field.

As threaded joints for steel pipes which do not need the application of a compound grease, JP 08-103724A, JP 08-233163A, JP 08-233164A, and JP 09-72467A disclose threaded joints in which a solid lubricating coating comprising a resin as a binder and molybdenum disulfide or tungsten disulfide as a solid lubricant is applied to a threaded portion and an unthreaded metal contact portion (namely, to the contact surface) of at least one of a pin and a box.

In these Japanese patent publications, in order to increase the adhesion between the solid lubricating coating and the substrate steel, it is disclosed to form, as an undercoating layer for the solid lubricating coating, a manganese phosphate chemical conversion coating layer or a combination of a nitride layer and a manganese phosphate chemical conversion coating layer, or to provide the contact surface with surface irregularities having an Rmax of 5–40 μm.

In JP 08-103724A, it is disclosed to use, as a lubricating powder, a molybdenum disulfide powder having a particle diameter of 0.45–10 μm and preferably 2–5 μm as measured by the Fischer method. With a particle diameter of less than 0.45 μm, no effect on improving against galling is obtained, while a 10 μm or higher particle size gives no additional effect on improving lubricity and makes it difficult to adjust the thickness of a solid lubricating coating.

It might be expected that the use of a threaded joint in which the contact surface of a pin and a box has a solid lubricating coating to provide lubricity thereto would make it possible to dispense with the application of a compound grease and thus avoid the aforementioned problems regarding the environment and working efficiency.

However, with a conventional solid lubricating coating, it is not possible to attain a high anti-seizing effect such as can be obtained by application of a compound grease, and a seizing flaw called galling occurs after fastening and loosening are repeated less than 10 times. Thus, there was the problem that it was not possible to prevent galling in a stable manner and maintain gas tightness.

Recently, a heat-resistant threaded joint for steel pipes has been desired for use in high-temperature oil wells in which the temperature reaches 250–300° C. which is higher than the temperature in conventional oil wells, or in steam injection oil wells into which steam at a high temperature close to the critical temperature (e.g., around 350° C.) is injected in order to improve oil recovery. Therefore, there are cases in which it is required for a threaded joint to guarantee galling resistance and gas tightness when a joint which has been fastened is subjected to a heating test at a temperature of 250° C. or higher and then subjected to loosening and re-fastening.

A conventional threaded joint having a solid lubricating coating formed on the contact surface in fact had an extremely inferior galling resistance compared to the case where a compound grease was applied, particularly when exposed to a high-temperature environment.

Thus, with a conventional threaded joint in which a solid lubricating coating is formed, it is still necessary to apply a compound grease, and the aforementioned problems with respect to the environment and working efficiency cannot be eliminated.

It is an object of this invention to provide a threaded joint for steel pipes having a solid lubricating coating which is capable of maintaining galling resistance and gas tightness in a stable manner without application of a compound grease.

It is another object of this invention to provide a threaded joint for steel pipes having improved galling resistance, which can prevent the occurrence of galling and a decrease in gas tightness upon repeated fastening and loosening without application of a compound grease when used in drilling for crude oil in high-temperature environments such as in deep, high-temperature oil wells or steam injection oil wells.

DISCLOSURE OF THE INVENTION

The present inventors investigated why a difference in performance between solid lubricating coatings occurs while concentrating on the structures of solid is lubricating coatings. As a result, it was found that the resistance to galling of a solid lubricating coating in a repeated fastening-loosening test is governed by the state of distribution (form of aggregates) of a lubricating powder present in the coating rather than by the particle diameter of the lubricating powder itself as described in JP 08-103724A.

Namely, when most particles of a lubricating powder in a solid lubricating coating are aggregated such that they are present in the form of large masses of aggregates or secondary particles having a size of 15–60 $\mu$m in equivalent circular diameter (equivalent diameter of an equal area circle) which is defined below, stable galling resistance can be ensured.

In addition, it was also found that the occurrence of galling which is particularly significant when fastening and loosening are repeated in a high-temperature environment is because a solid lubricating coating abrades soon due to its decreased abrasion resistance at a high temperature and that the high-temperature abrasion resistance of a solid lubricating coating can be markedly increased by incorporating a fibrous filler in the coating.

In one embodiment, the present invention is a threaded joint for steel pipes comprising a pin and a box each having a contact surface including a threaded portion and an unthreaded metal contact portion, characterized in that the contact surface of at least one of the pin and the box has a solid lubricating coating comprising a lubricating powder and a binder, wherein the proportion of area of a cross section along the thickness of the solid lubricating coating which is occupied by secondary particles of the lubricating powder having an equivalent circular diameter of 15–60 $\mu$m is from 5% to 90%.

In the present invention, the particle diameter of a secondary particle means the diameter of a powder aggregate (secondary particle) present in a solid lubricating coating. The equivalent circular diameter of a secondary particle of a lubricating powder will be described below.

In another embodiment, the present invention is a threaded joint for steel pipes comprising a pin and a box each having a contact surface including a threaded portion and an unthreaded metal contact portion, characterized in that the contact surface of at least one of the pin and the box has a solid lubricating coating comprising a lubricating powder, a fibrous filler, and a binder in which the mass ratio of the fibrous filler to the binder is in the range of from 0.01 to 0.5.

In a preferred embodiment of the present invention, the lubricating powder is one or more powdery substances selected from molybdenum disulfide, tungsten disulfide, organomolybdenum compounds, graphite, boron nitride, and polytetrafluoroethylene.

DETAILED DESCRIPTION OF THE INVENTION

Figure 2:
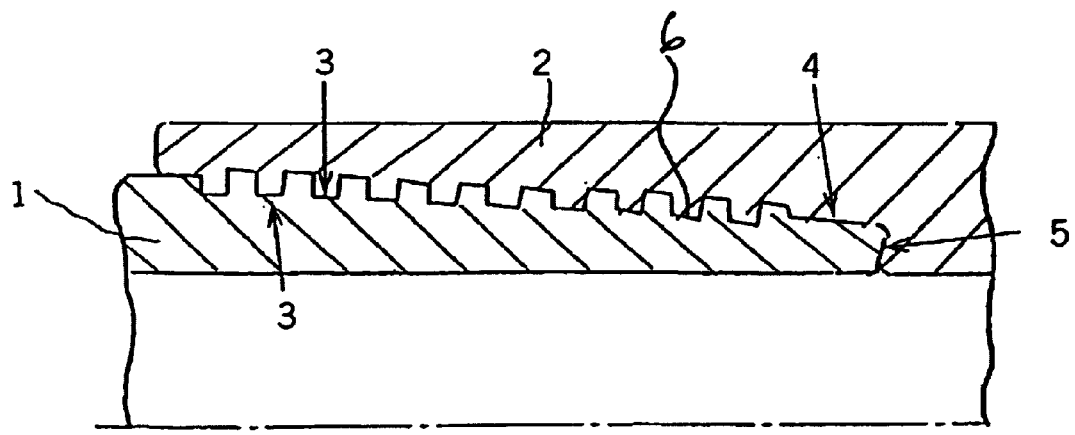
FIG. 2 is a diagram which schematically shows a connecting portion of a typical threaded joint for steel pipes according to the present invention.

FIG. 2 is a diagram which schematically shows the structure of a typical threaded joint for steel pipes. In the figure, 1 is a pin, 2 is a box, 3 is a threaded portion, 4 is an unthreaded metal contact portion, 5 is a shoulder portion, and 6 is a solid lubricating coating. In the following description, an unthreaded metal contact portion will also be referred to as just a metal contact portion.

As shown in FIG. 2, a typical threaded joint is comprised of a pin 1 having a threaded portion 3 (more precisely, a male thread portion) and an unthreaded metal contact portion 4 formed on the outer surface at an end of a steel pipe, and a box 2 having a threaded portion 3 (more precisely, a female thread portion) and an unthreaded metal contact portion 4 formed on the inner surface of a threaded joint member (a coupling). However, the location of a pin and a box is not limited to the depicted one. For example, a coupling may be omitted by forming a pin at one end of a steel pipe and a box at the other end of the pipe, or a pin (a male thread) may be formed on a coupling with a box being formed at both ends of a steel pipe.

The threaded portion 3 and the unthreaded metal contact portion 4 on each of the pin and the box constitute a contact surface of the threaded joint. The contact surface and particularly the unthreaded metal contact portion which is more susceptible to galling is required to have galling resistance. For this purpose, in the prior art, a compound grease containing a heavy metal powder was applied to the contact surface, but the use of a compound grease involves many problems from a standpoint of the environment and working efficiency.

In order to solve these problems, a threaded joint has been developed which does not require the application of a compound grease and which has a solid lubricating coating on the contact surface of at least one of the pin and box formed by applying to the contact surface a coating fluid containing a resin and a lubricating powder in a solvent followed by heating the wet coating, as disclosed in JP 08-103724A, etc. However, as described previously, with a conventional threaded joint of this type, galling resistance and air tightness cannot be ensured in a stable manner.

The present inventors prepared an experimental coating fluid for forming a solid lubricating coating using a molybdenum disulfide powder having a mean particle diameter of 3.5 μm as a lubricating powder, a polyamideimide resin as a binder, and a mixed solvent of ethanol and toluene (50:50) as a solvent to dissolve the resin and disperse the lubricating powder. In this case, the degree of aggregation of the molybdenum disulfide powder could be varied by adjusting the viscosity of the coating fluid and the length of time for which the fluid was left to stand after mixing with stirring, and it was found that the performance of the resulting solid lubricating coating with respect to galling resistance significantly varies with the size of the secondary particles formed by aggregation.

Namely, even when the same lubricating powder that is a molybdenum disulfide powder having a mean particle diameter of 3.5 μm is used along with the same resin and solvent to form a solid lubricating coating, the galling resistance of the resulting coating fluctuates. It was found that one of the factors governing the fluctuation in galling resistance is the degree of aggregation of the lubricating powder in a solid lubricating coating.

In the case of a lubricating powder having a mean particle diameter (mean primary particle diameter) which is as small as 10 μm or less, for example, when the lubricating powder is dispersed in a resin solution to form a coating fluid, the primary particles of the powder are aggregated in the fluid to form secondary particles. Therefore, also in a solid lubricating coating formed by application of the coating fluid and drying, the lubricating powder is mostly present in the form of secondary particles formed by aggregation of primary particles (i.e., molybdenum disulfide particles having a mean diameter of 3.5 μm in the above-described example).

Figure 3:
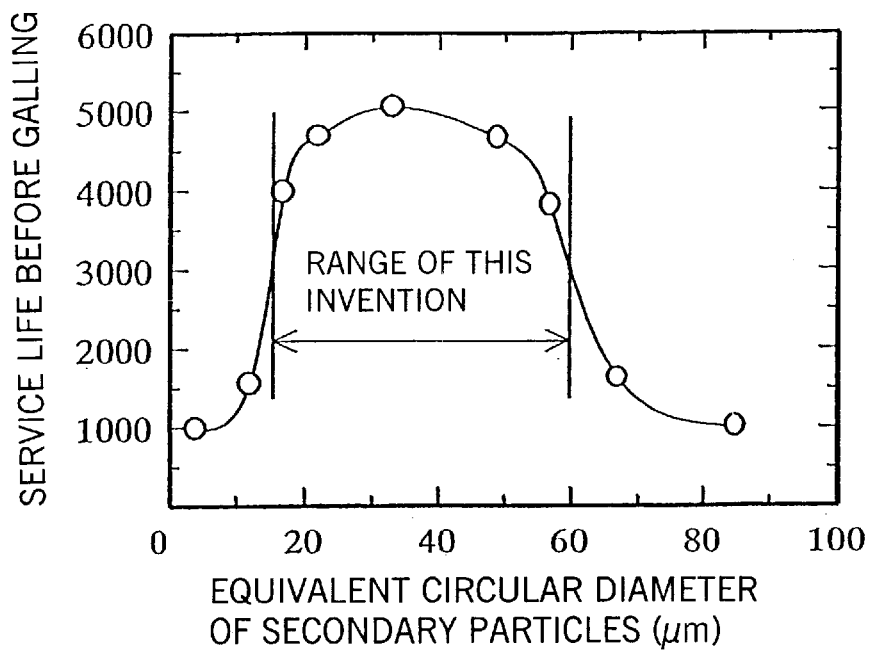
FIG. 3 is a schematic diagram showing the relationship between the equivalent circular diameter of a lubricating powder secondary particle and galling resistance.

The present inventors performed an experiment in which a coating fluid having a different degree of aggregation of a lubricating powder was used to form a solid lubricating coating having a different degree of aggregation of the powder in order to investigate the relationship between the galling resistance (service life before the occurrence of galling) and the diameter of secondary particles (a mean value of equivalent circular diameters) in the coating, and obtained the result shown in FIG. 3. From this figure, it can be seen that the galling resistance is good when the secondary particles of a lubricating powder present in a solid lubricating coating have an equivalent circular diameter in the range of 15–60 μm.

Figure 4:
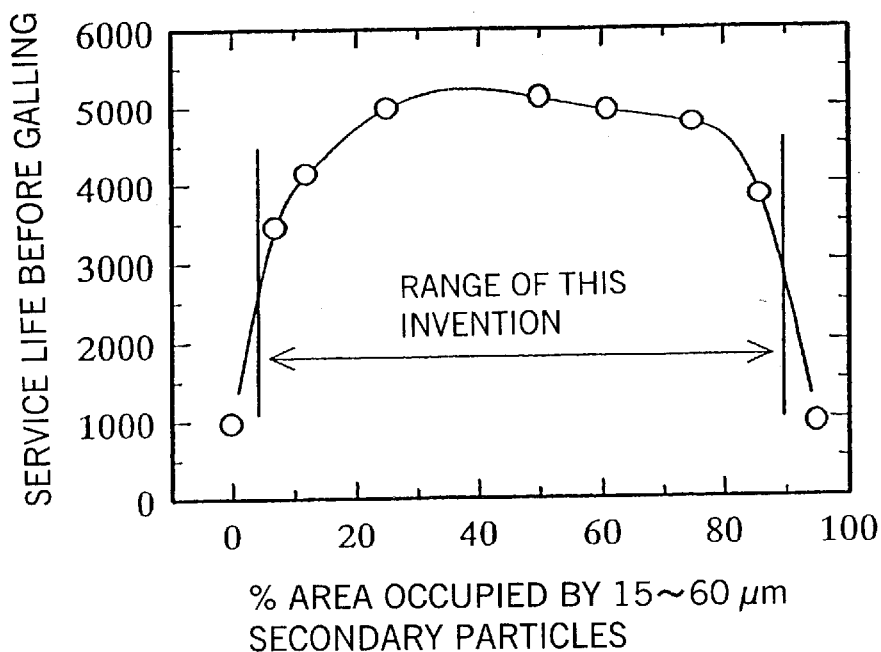
FIG. 4 is a schematic diagram showing the relationship between the proportion of area occupied by lubricating powder secondary particles having an equivalent circular diameter of 15–60 $\mu$m in a solid lubricating coating and galling resistance.

However, in practice, the degree of aggregation of a lubricating powder is not uniform in a solid lubricating coating, and some primary particles may still be present as primary particles or may form smaller secondary particles. Therefore, the effect of fluctuation in the degree of aggregation was also investigated. As a result, as shown in FIG. 4, it was found that the galling resistance of a solid lubricating coating is significantly improved when the proportion of area of a cross section along the thickness of the coating which is occupied by secondary particles of the lubricating powder having an equivalent circular diameter of 15–60 μm is from 5% to 90%.

In the present invention, the equivalent circular diameter (equivalent diameter of an equal area circle) of a secondary particle in a cross section of a solid lubricating coating is determined by observation of a cross section along the thickness of the solid lubricating coating under a scanning electron microscope. Namely, an electron micrograph of the coating cross section is subjected to computerized image analysis to determine the cross-sectional areas of individual secondary particles, and the diameter of the circle having the same area as the cross-sectional area of each secondary particle is taken as the equivalent circular diameter of the secondary particle. The equivalent circular diameter is hereinafter referred to simply as the equivalent diameter.

The proportion of area of a cross section of a solid lubricating coating occupied by particles is determined by observing a cross section along the thickness of a solid lubricating coating under a scanning electron microscope and measuring the cross-sectional area of every particle appearing in five randomly selected 100 mm-square fields of view of a 200×micrograph by means of computerized image analysis. For each field of view, all the particles having an equivalent diameter which falls within the range of from 0.3 to 100 μm are measured for cross-sectional area, and the total area of cross-sectional areas of those secondary particles having an equivalent diameter of 15–60 μm is calculated to determine the proportion of the total area relative to the area of the field of view, which is the proportion of area to be determined. The "proportion of area occupied by secondary particles having an equivalent diameter of 15–60 μm" as used herein is the average determined for the five fields of view. In the present invention, those particles of a lubricating powder which have an equivalent diameter of smaller than 0.3 μm or greater than 100 μm are considered to be negligible.

In a threaded joint for steel pipes according to one embodiment of the present invention, a solid lubricating coating comprising a lubricating powder and a binder is formed on the contact surface of at least one of the pin and the box constituting the joint, and the proportion of area of a cross section along the thickness of the solid lubricating coating which is occupied by secondary particles of the lubricating powder having an equivalent diameter of 15–60 μm (hereunder, the proportion being sometimes referred to as "proportion of area occupied by 15–60 μm secondary particles") is from 5% to 90%. Such a threaded joint can alleviate the problem found in the prior art threaded joint having a solid lubricating coating that the frequency of occurrence of threaded joints having poor galling resistance is high in the case where a compound grease containing a heavy metal powder is not applied.

The reason why improved galling resistance is attained in a stable manner when the proportion of area occupied by 15–60 μm secondary particles in a cross section of a solid lubricating coating is from 5% to 90% has not been elucidated completely, but it is considered at present to be as follows.

It is presumed that when a solid lubricating coating formed on a threaded joint is subjected to repeated sliding friction while the threaded joint is fastened and loosened, abraded particles comprising a lubricating powder and a binder are formed by the friction, and they contribute to prevention of metal-to-metal contact at the contacting interface and to alleviation of friction, thereby exhibiting an anti-galling effect. If the particles of a lubricating powder in a solid lubricating coating are as small as 0.4–10 μm, for example, the abraded particles formed from the coating by sliding friction are also small so that they do not produce a sufficient effect to prevent metal-to-metal contact at the frictional interface, and galling tends to occur easily. On the contrary, when a lubricating powder is aggregated to form large secondary particles, the abraded particles are also large so that metal-to-metal contact can be effectively suppressed at the contacting interface, and galling resistance is improved significantly.

The equivalent diameter of secondary particles of lubricating powder which is effective in order to improve galling resistance is in the range of 15–60 μm. If the equivalent diameter is less than 15 μm, prevention of metal-to-metal contact and hence galling is not sufficiently effective for the reason mentioned above. If it is greater than 60 μm, the resulting solid lubricant coating has not only a decreased strength, but also a decreased adhesion to the substrate surface, so it is easy for the coating to peel off during fastening and loosening, and the occurrence of galling cannot be suppressed. In view of galling resistance and strength and adhesion of a solid lubricating coating, it is preferable that the equivalent diameter of the secondary particles be 20–50 μm.

The proportion (abundance ratio) of secondary particles having an equivalent diameter of 15–60 μm in a coating is 5–90% in terms of the proportion of area occupied by such secondary particles in the entire area of a cross section of the coating. If this proportion of area is less than 5%, the amount of secondary particles of lubricating powder present on the contacting interface is so small that it does not provide a sufficient effect toward prevention of galling. If it is greater than 90%, the coating has a decreased strength and a decreased adhesion to the substrate surface, and also in this case, the coating does not provide a sufficient effect toward prevention of galling. In view of galling resistance and adhesion, it is preferable that the above-described proportion be in the range of 10–85%, more preferably 30–85%, and most preferably 50–85%.

The solid lubricating coating according to a first embodiment just mentioned may consist essentially of a lubricating powder and a binder, although the solid lubricating coating may contain other constituents as long as they do not have a significant adverse effect on the properties of the coating. The coating may be formed by application of a coating fluid, which comprises a lubricating powder in a binder solution which contains a binder dissolved (or dispersed) in a solvent, followed by drying. The application may be performed in any suitable method known in the art including brush coating, dipping, and air spraying.

The lubricating powder is not limited to a powder of molybdenum disulfide, and results similar to the above may be obtained using a powder of tungsten disulfide, graphite, organomolybdenum compounds (e.g., molybdenum dialkylthiophosphates and molybdenum dialkylthiocarbamates), PTFE (polytetrafluoroethylene), or BN (boron nitride). One or more of these materials may be used as a lubricating powder.

The binder may be either an organic resin or an inorganic polymer.

An organic resin having thermal resistance and a reasonable level of hardness and abrasion resistance is suitable for use as a binder. Examples of such a resin include thermosetting resins such as epoxy resins, polyimide resins, polycarbodiimide resins, polyethersulfones, polyetheretherketones, phenolic resins, furan resins, urea resins, and acrylic resins, as well as thermoplastic resins such as polyamideimide resins, polyethylene resins, silicone resins, and polystyrene resins.

A solvent used with an organic resin may be a single solvent or a mixed solvent selected from various low-boiling solvents including hydrocarbons (e.g., toluene) and alcohols (e.g., isopropyl alcohol).

In the cases where the binder is an organic resin, in view of adhesion and abrasion resistance of the resulting lubricating coating, it is preferable that application of a coating fluid be followed by heating the coating for hardening. The heating is preferably performed at a temperature of 120° C. or higher and more preferably 150–380° C. The duration of heating may be determined depending on the size of the threaded joint for steel pipes, and it is preferably 30 minutes or longer and more preferably 30–60 minutes.

An inorganic polymer which can be used as a binder in the present invention is a film-forming material having a three-dimensionally cross-linked structure of metal-oxygen bonds such as Ti—O, Si—O, Zr—O, Mn—O, Ce—O, or Ba—O, which is formed by a film-forming method called the sol-gel method. Such an inorganic polymer can be formed by hydrolysis and subsequent condensation of a metal alkoxide. Useful metal alkoxides include those compounds in which the alkoxy groups are lower ones such as methoxy, ethoxy, isopropoxy, propoxy, isobutoxy, butoxy, and tert-butoxy. A preferable metal alkoxide is a titanium or silicon alkoxide, and particularly a titanium alkoxide. The most preferable compound is titanium isopropoxide since it has excellent film-forming properties. In addition to metal alkoxides, metal chlorides such as titanium tetrachloride and metal carboxylates may also be used.

The metal alkoxide used to form an inorganic polymer may be a compound such as a silane coupling agent in which part of the alkoxy groups are replaced by an alkyl group which may have a functional group.

When the binder is an inorganic polymer, various organic solvents such as polar solvents including alcohols (e.g., ethyl alcohol, isopropyl alcohol, and butyl alcohol) and ketones, hydrocarbons, and halogenated hydrocarbons may be used. In order to promote the formation of a coating, the metal alkoxide in solution may previously be partially hydrolyzed prior to application. In addition, a small amount of water and/or an acid as a hydrolytic catalyst may be added to a solution of a metal alkoxide in order to accelerate hydrolysis after application.

After a lubricating powder is dispersed in a solution of a metal alkoxide or other substance forming an inorganic polymer to form a coating fluid, the coating fluid is applied onto the contact surface of a pin and/or box and then dried. In order to accelerate the formation of a coating by hydrolysis of the alkoxide, humidification may be performed subsequent to application. The humidification may be achieved by allowing the pin and/or box to stand in the atmosphere, preferably with the atmosphere having a humidity of 70% or higher, for a certain period. Preferably, the humidification is followed by heating. Heating serves to accelerate the hydrolysis reaction and the subsequent condensation of the resulting hydrolyzate as well as the discharge of the alcohol that is formed as a by-product in the hydrolysis reaction, thereby reducing the time required to form the coating and intensifying the adhesion of the resulting solid lubricating coating, which leads to improved galling resistance. The heating is preferably carried out after the solvent has been evaporated. The heating temperature is preferably in the range of 100–200° C., which is close to the boiling point of the alcohol by-product. Hot air heating is more effective.

According to the first embodiment of the present invention, a lubricating powder is present in a solid lubricating coating in such a manner that secondary particles of the powder having an equivalent diameter of 15–60 μm occupy 5–90% of the entire area in a cross section of the coating.

One possible method to obtain such a coating is that a lubricating powder having a primary particle diameter of 15–60 μm is used in such an amount that the proportion of area occupied by the primary particles is 5–90% of the entire area of cross section of the coating (in this case, the proportion of area can be approximated by the proportion of volume) while suppressing aggregation of the powder in a coating fluid. For example, if a coarse lubricating powder having a mean particle diameter of 25 to 50 $\mu$m is used and a coating fluid having a high viscosity is formed, it is difficult for the powder to aggregate in the coating fluid, and many of the powder particles remain as primary particles. If aggregation does not occur, the diameter of the secondary particles is the same as that of the primary particles. Therefore, it is possible to form a solid lubricating coating which satisfies the requirement for the proportion of area occupied by the secondary particles of a lubricating powder defined according to the present invention in a reliable manner. However, this method has the problem that the lubricating powder is coarse and the distribution of the lubricating powder tends to be uneven, particularly if the proportion of area is small.

A more preferable method is to use a lubricating powder having a mean primary particle diameter of 15 $\mu$m or smaller. The lubricating powder is aggregated in a coating fluid after it is mixed with a resin and a solvent, thereby growing the primary particles into secondary particles formed by uniting a number of the primary particles to such an extent that the proportion of area occupied by secondary particles having an equivalent diameter of 15–60 $\mu$m is 5 to 90%. In this method, it is preferable that the lubricating powder have a mean particle diameter for primary particles of 0.5–15 $\mu$m and more preferably 1–10 $\mu$m. If the mean primary particle diameter is smaller than 0.5 $\mu$m, aggregation tends to occur unevenly, and the control of aggregation becomes difficult. The extent of aggregation of the powder (i.e., the diameter of secondary particles) can be adjusted by the amount of the solvent and/or the viscosity of the coating fluid, and the length of time for which the coating fluid is left to stand (at rest). Thus, as the amount of the solvent is increased or the viscosity is decreased, aggregation tends to proceed readily while a coating fluid is left to stand. Of course, the longer the standing time, the further the aggregation proceeds.

According to a conventional common idea, it has been considered good to use a coating fluid in which the powder present therein is dispersed as uniformly as possible in order to make the resulting coating uniform, namely, to apply a coating fluid immediately after stirring. In contrast, according to the present invention, a coating fluid is left to stand to aggregate the particles of a lubricating powder before use for application.

The proportion of area occupied by the secondary particles also depends on the volume ratio of binder to lubricating powder. Thus, assuming that all the particles of a lubricating coating in a coating are in the form of secondary particles having an equivalent diameter of 15–60 $\mu$m, the proportion of area can be approximated by the proportion of volume of the lubricating powder relative to the total volume of the binder and the lubricating powder. In this case, a coating composition is prepared in such a manner that the proportion of volume (volume percent) of the lubricating powder relative to the total volume of the binder and the lubricating powder is 5–90%, thereby making it possible to form a solid lubricating coating in which the proportion of area of the secondary particles is 5–90%. However, there are the cases in which all the lubricating powder do not grow to form secondary particles having an equivalent diameter of 15–60 $\mu$m. In such cases, taking the extent of aggregation into consideration, the lubricating powder is added in an amount in volume percent which is larger than the desired proportion of area of the secondary particles.

Next, in a threaded joint for steel pipes according to a second embodiment of the present invention, a certain amount of a fibrous filler is included in a solid lubricating coating which comprises a lubricating powder and a binder, whereby the solid lubricating coating has a significantly improved abrasion resistance, particularly at high temperatures. As a result, even in the case of a threaded joint for steel pipes which is used in a high-temperature environment such as a high-temperature oil well or steam injection oil well, it is possible to significantly suppress the occurrence of galling during repeated fastening and loosening without application of a compound grease.

The fibrous filler used in the present invention may be any of artificial mineral fibers, naturally-occurring mineral fibers, heat-resisting, high-strength organic fibers, and metal fibers, for example. The fibrous filler may be in the form of either whiskers as acicular single crystals or short fibers formed by cutting continuous filament fibers.

The whiskers which are acicular single crystals include fibers of ceramics such as alumina, silica, mullite, zirconia, silicon carbide, and silicon nitride, fibers of metals such as copper and steel, and fibers of inorganic compounds such as potassium titanate, zinc oxide, and aluminum borate. The continuous filament fibers include glass fibers, polycrystalline carbon fibers, metal fibers such as those of tungsten, molybdenum, copper, nickel, and steel, and various organic fibers. An example of heat-resisting, high-strength organic fibers is Kevlar™. Continuous filament fibers are preferably used in the form of short fibers having a length of 10 to 500 $\mu$m.

From the standpoint of improvement in abrasion resistance of a solid lubricating coating at high temperatures, preferred fibrous fillers are inorganic fibrous fillers, and particularly whiskers of the above-described ceramics and inorganic compounds, carbon fibers, glass fibers, and the like are preferred. More preferred fibrous fillers are whiskers of one or more materials selected from potassium titanate, zinc oxide, aluminum borate, silicon carbide, and silicon nitride. When the binder is a resin, particularly preferred from the standpoint of dispersibility of fibers in a resin are potassium titanate, zinc oxide, and silicon carbide.

When the fibrous filler is whiskers, it is desirable that their cross-sectional diameter be 0.1–25 $\mu$m. If the cross-sectional diameter is less than 0.1 $\mu$m, the solid lubricating coating formed on the contact surface of a threaded joint for steel pipes may have insufficient abrasion resistance at high temperatures or coating strength. On the other hand, if whiskers have a cross-sectional diameter of greater than 25 $\mu$m, the solid lubricating coating may have a decreased strength or adhesion. Similarly, in the case where continuous filament fibers are used as the fibrous filler, their diameter is preferably the same as above. Whiskers can be used as they are without cutting, but if it is difficult to disperse them uniformly in the coating, they may be used after they are cut to an appropriate shorter length.

The content of the fibrous filler in a solid lubricating coating is such that the mass ratio of the fibrous filler to the binder is in the range of 0.01–0.5. If this mass ratio is less than 0.01, it is not possible to improve a threaded joint for steep pipes sufficiently with respect to galling resistance at high temperatures. If this mass ratio is greater than 0.5, the resulting solid lubricant coating has insufficient strength and adhesion to the substrate surface. The mass ratio is preferably in the range of 0.05–0.4 and more preferably 0.1–0.3.

The types of lubricating powder and binder used in a solid lubricating coating for a threaded joint for steel pipes according to the second embodiment of the present invention may be the same as those described for the first embodiment.

Thus, although there is no restriction on the lubricating powder as long as it has a lubricating effect, a powder of one or more materials selected from molybdenum disulfide, tungsten disulfide, organomolybdenum compounds, graphite, boron nitride, and polytetrafluoroethylene is preferred from the standpoint of galling resistance. Molybdenum disulfide, tungsten disulfide, graphite, and boron nitride are more preferable from the standpoint of abrasion resistance at high temperatures.

Preferably, the lubricating powder has a mean particle diameter (mean primary particle diameter) in the range of 0.5–60 μm. As set forth earlier, a lubricating powder having a mean particle diameter of less than 0.5 μm tends to aggregate unevenly, and thus it may be difficult to disperse it uniformly in a solid lubricating coating, and the properties of the resulting coating may become poor locally. On the other hand, if the mean particle diameter of the lubricating powder is larger than 60 μm, not only the strength but also the adhesion to the substrate surface may decrease to such an extent that the occurrence of galling cannot be prevented.

The binder may be any material capable of binding a lubricating powder and a fibrous filler, and both the above-described resins and inorganic polymers can be used. A preferred binder used in the second embodiment is an organic resin.

In a threaded joint for steel pipes according to the second embodiment of the present invention, the ratio of lubricating powder to resin binder in a solid lubricating coating is not limited, but it is preferred that it have a mass ratio of the lubricating powder to the binder in the range of 0.3–9.0 from the standpoint of galling resistance. If the mass ratio of lubricating powder to binder is less than 0.3, the amount of the lubricating powder in the above-described abraded particles may be insufficient, and galling resistance may become poor. On the other hand, if the mass ratio is greater than 9.0, the solid lubricating coating may have insufficient strength whereby it cannot withstand a high pressure and has a decreased adhesion to the substrate surface, thereby causing the galling resistance and gas tightness to deteriorate. The mass ratio of the lubricating powder to the binder is preferably in the range of 0.5–9.0 in view of galling resistance and more preferably in the range of 1.0–8.5 further taking adhesion into consideration.

A coating fluid is prepared by dispersing a lubricating powder and a fibrous filler in a solution (or dispersion) of a binder. A threaded joint for steel pipes according to the second embodiment of the present invention is obtained by applying the coating fluid to the contact surface of at least the pin and box of a threaded joint and drying the wet coating to form a solid lubricating coating. The coating fluid prepared as above can be used immediately for application, but as described with respect to the first embodiment, it may be left to stand to aggregate the lubricating powder prior to use for application.

In each of the first and the second embodiments of the present invention, it is desirable that the solid lubricating coating have a thickness of at least 5 μm and not greater than 50 μm. The lubricating powder present in the solid lubricating coating extends over the entire contact surface under a high pressure, thereby exhibiting an improved galling resistance. With a solid lubricating coating having a thickness of less than 5 μm, the amount of the lubricating powder present therein may be small, and the effectiveness of the coating in improving lubricity may be decreased. When the thickness of the solid lubricating coating is greater than 50 μm, there are cases in which the gas tightness is decreased due to insufficient tightening during fastening, or if the pressure is increased in order to guarantee the gas tightness, galling may occur easily, or the solid lubricating coating may peel off easily. From the standpoint of galling resistance, the thickness of the solid lubricating coating is more preferably at least 15 μm and at most 40 μm.

To the solid lubricating coating, various additives including an anti-corrosive agent may be added as long as they do not adversely affect galling resistance. For example, one or more powders selected from zinc powder, a chrome pigment, silica, and alumina may be added. In addition, a colorant may be present such that the resulting solid lubricating coating is colored. If appropriate, the coating fluid may contain one or more additives such as a dispersant, an antifoaming agent, and a thickening agent.

It is desirable that the contact surface of at least one of the pin and the box on which a solid lubricating coating is formed according to the present invention be previously roughened such that the surface has a roughness (Rmax) which is greater than the surface roughness as machined (3–5 μm) in order to guarantee the adhesion of the solid lubricating coating.

The method of surface roughening may be a method of roughening the steel surface itself such as blasting with sands or grit and dipping in a strong acid solution such as sulfuric acid, hydrochloric acid, nitric acid, and hydrofluoric acid to roughen the surface. Another possible method is to form a primary (underlying) coat layer having a rougher surface than the steel surface to roughen the surface to be applied. The primary coat layer is disposed between the contact surface of the joint and the solid lubricating coating.

Examples of a method of forming such a primary coat layer include a method of forming a chemical conversion coating such as a phosphate, oxalate, or borate treatment (in which the surface roughness of the crystal layer increases as the crystals formed grow), a method of electroplating with a metal such as copper or iron (in which peaks or raised points are preferentially plated so that the surface is slightly roughened), an impact plating method in which particles having an iron core coated with zinc or a zinc-iron alloy are blasted using centrifugal force or pneumatic pressure to form a coating of zinc or a zinc-iron alloy, a soft nitriding method forming a nitride layer (e.g., tuffiriding), a composite metallic coating method in which a porous coating comprising solid fine particles in a metal is formed, and the like.

From the viewpoint of adhesion of a solid lubricating coating, a porous coating, particularly a chemical conversion coating formed by phosphating (with manganese phosphate, zinc phosphate, iron-manganese phosphate, or zinc-calcium phosphate) or a coating of zinc or a zinc-iron alloy formed by impact plating is preferred. A more preferred coating is a manganese phosphate coating from the standpoint of adhesion or a zinc or zinc-iron alloy coating from the standpoint of rust prevention.

Both a phosphate coating formed by chemical conversion treatment and a zinc or zinc-iron alloy coating formed by impact plating are porous, so they can provide a solid lubricating coating formed thereon with an increased adhesion. As a result, the solid lubricating coating is prevented from peeling off while the threaded joint is subjected to repeated fastening and loosening, and it continues to prevent metal-to-metal contact and contributes to still further improvement in gas tightness and rust prevention of the joint.

Although the primary coat layer is porous, a solid lubricating coating is formed thereon according to the present invention, and thus the cavities in the porous primary coat layer are blocked or sealed, causing no decrease in rust prevention or gas tightness. When the porous primary coat layer is a zinc or zinc-iron alloy coating formed by impact plating, since zinc is a metal which is more base (less noble) than iron, it exhibits a sacrificial anti-corrosive effect by ionizing preferentially to iron, and a still further improved rust prevention can be achieved.

The porous zinc or zinc-iron coating can be formed by impact plating method, which is a kind of dry process plating method, and particularly by a blast plating method using a blasting apparatus to cause particles to impinge toward the surface to be plated. Blasting apparatuses useful for blast plating include a high-pressure fluid blasting apparatus in which particles are blasted using a high pressure fluid such as compressed air, and a mechanical blasting apparatus using a rotor blade such as an impeller. Either may be used.

The particles used in blast plating are metal particles having zinc or a zinc-iron alloy at least on the surface thereof. Although the particles may be made entirely of zinc or a zinc-iron alloy, preferred particles are the blasting material disclosed in JP 59-9312B. The blasting material consists of particles having a core of iron or an iron alloy and a zinc or zinc-iron alloy layer with which the surface of the core is coated. Preferably, the particles contain zinc or a zinc-iron alloy in an amount of 20–60 mass % and have a particle diameter of 0.2–1.5 $\mu$m.

When the particles having an iron-based core coated with zinc or a zinc-iron alloy are blasted at a substrate, only the zinc or zinc-iron alloy forming the coating layer of the particles is deposited on the substrate to form a coating of zinc or a zinc-iron alloy. Blast plating can form a plated coating with good adhesion on a steel surface regardless of steel composition. Thus, it is possible to form a zinc or a zinc alloy coating layer with good adhesion on the contact surface of a threaded joint made of a wide variety of steels including from a carbon steel to a high alloy steel.

When one of the above-described various primary coat layers is formed, the thickness of the layer is not restricted, but it is preferably in the range of 5–40 $\mu$m from the standpoints of rust prevention and adhesion. With a thickness of less than 5 $\mu$m, sufficient rust prevention may not be achieved. A thickness of greater than 40 $\mu$m may cause a decrease in adhesion of a solid lubricating coating formed thereon.

Figure 1:
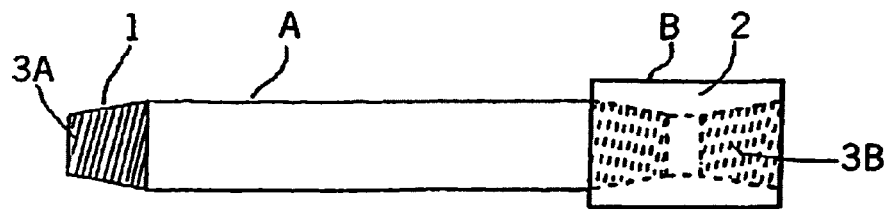
FIG. 1 is, as described previously, a diagram which schematically shows a typical assembly of a steel pipe and a threaded coupling at the time of shipment of the steel pipe.

Although the solid lubricating coating may be applied to the contact surface of both the pin and the box, the objects of the present invention can be achieved by applying the coating to only one of these elements, and this is advantageous in terms of cost. In such cases, the solid lubricating coating is formed by a relatively easy operation if it is formed on the contact surface of a box, which is shorter. The other joint element (preferably a pin), to which the solid lubricating coating is not applied, may be uncoated. In particular, when the pin and the box are temporarily fastened to each other before shipment as shown in FIG. 1, the other joint element, e.g., the pin, can be prevented from rusting even if its contact surface is uncoated (e.g., even if it is as-machined), since the contact surface of the pin is brought into intimate contact with the coating formed on the contact surface of the box by the temporary fastening. The solid lubricating coating may be applied to only a part of the contact surface, particularly only to the metal contact portion.

However, when a box is connected to a pin of a steel pipe at one end of the pipe as shown in FIG. 1, the other pin of the steel pipe which is located at the opposite end of the pipe and the unconnected half of the box remain exposed to the atmosphere. These exposed contact surfaces of the pin and the box may be subjected to a suitable surface treatment to provide rust prevention with or without lubricity, and/or may be protected by attachment of a suitable protector. Such surface treatment may be applied to the contact surface of the aforementioned other joint element.

When a solid lubricating coating is formed on the contact surface of only one of the pin and the box, it is desirable that the contact surface of the other element have a surface roughness of at most 10 $\mu$m Rmax. If the other element has a surface roughness greater than 10 $\mu$m, it provides an increased coefficient of friction to the solid lubricating coating, and as the surface roughness increases, the abrasion of the solid lubricating coating may increase in geometric progression, thereby causing premature wear-out of the solid lubricating coating during repeated fastening and loosening of the joint and making it impossible to maintain galling resistance, rust prevention, and gas tightness. When a solid lubricating coating is formed on the contact surface of both the pin and the box, the solid lubricating coating formed on each of these joint elements preferably has a surface roughness (after coating) of at most 10 $\mu$m.

A threaded joint for steel pipes according to the present invention can be fastened without application of a compound grease, but an oil may be applied to the solid lubricating coating or the contact surface of the mating element to be connected, if desired. In the latter case, the oil which is applied is not restricted, and any of a mineral oil, a synthetic ester oil, and an animal or vegetable oil may be used. Various additives such as a rust-preventing agent and an extreme pressure agent which have conventionally been used for lubricating oils may be added to the oil. If such an additive is a liquid, it may be used alone as an oil to be applied.

Useful rust-preventing agents include basic metal sulfonates, basic metal phenates, basic metal carboxylates, and the like. As an extreme pressure agent, known agents such as sulfur-, phosphorus-, or chlorine-containing ones and organometal salts may be used. In addition, other additives such as an anti-oxidant, a pour point depressant, and a viscosity index improver may be added to the oil.

EXAMPLES

Examples 1–8 and Comparative Examples 1–3

These examples illustrate the first embodiment of the present invention.

The contact surface of each of the pin and the box of a threaded joint for steel pipes [outer diameter: 7 inches (178 mm), wall thickness: 0.408 inches (10.4 mm)] made of a material selected from a carbon steel A, a Cr—Mo steel B, a 13%-Cr steel C, and a high alloy steel D each having a composition shown in Table 1 (galling occurring most easily with D, and galling becoming successively more difficult with C, B, and A) were subjected to the surface treatment (surface pretreatment and formation of a solid lubricating coating, if any) shown in Table 2 to form threaded joints for examples according to the present invention and comparative examples, each having a solid lubricating coating in the contact surface of at least one of the pin and the box. The details of the surface treatment are described later for each example.

Table 2 shows the data on the pretreatment, i.e., the surface roughness in Rmax (R) of the substrate steel and the thickness of a primary coat layer (t) for each of the pin and the box, as well as the constitution of a solid lubricating coating, i.e., the particular binder and lubricating powder used, the proportion of area (A) occupied by lubricating powder secondary particles having an equivalent diameter of 15–60 μm in a cross section of the coating along its thickness as determined in the aforementioned manner, and the thickness of the lubricating coating (t) formed on the pretreated surface of the pin and/or box.

Using a threaded joint having a solid lubricating coating on the contact surface of the pin and/or the box, a test was carried out by repeating fastening and loosening operations up to 20 times with a fastening speed of 10 rpm and a fastening torque of 10340 ft-lbs (14019 N-m) while examining the occurrence of seizing. When seizing occurred during the test, subsequent fastening was carried out after the seized surface was repaired by dressing, but the test was terminated at the point that severe seizing (galling) occurred so that fastening could not be performed even with surface dressing or loosening was not possible. In all the threaded joints tested, no seizing was found before fastening and loosening were repeated 5 times, so the occurrence of seizing or galling and rusting for the 6th and later time is shown in Table 3.

To the contact surface of the pin or box on which a solid lubricating coating was not formed, a commercially available, ordinary rust-preventing oil which did not contain heavy metal powder was applied in order to prevent the surface from rusting. The fastening and loosening test was carried out without removing the rust-preventing oil.

TABLE 1

| Steel Type | mass % | | | | | | | | |
|---|---|---|---|---|---|---|---|---|---|
|  | C | Si | Mn | P | S | Cu | Ni | Cr | Mo |
| A | 0.24 | 0.30 | 1.30 | 0.02 | 0.01 | 0.04 | 0.07 | 0.17 | 0.04 |
| B | 0.25 | 0.25 | 0.80 | 0.02 | 0.01 | 0.04 | 0.05 | 0.95 | 0.18 |
| C | 0.19 | 0.25 | 0.80 | 0.02 | 0.01 | 0.04 | 0.10 | 13.0 | 0.04 |
| D | 0.02 | 0.30 | 0.50 | 0.02 | 0.01 | 0.50 | 7.00 | 25.0 | 3.20 |

TABLE 2

| TYPE | No. | ST[1] | Pin Pretreatment | Pin Lubricating Coating | Box Pretreatment | Box Lubricating Coating |
|---|---|---|---|---|---|---|
| EXAMPLES | 1 | A | Grinding, R = 2 | None | Sand blasting, R = 10 | Polyamideimide resin/MoS$_2$ A = 80, t = 25 |
|  | 2 | A | Grinding, R = 2 | None | 1. Grinding, R = 2 2. Mn phosphating t = 25 | Polyamideimide resin/MoS$_2$ A = 80, t = 25 |
|  | 3 | B | Grinding, R = 2 | None | 1. Grinding, R = 3 2. Mn phosphating t = 20 | Epoxy resin/ WS$_2$ A = 80, t = 20 |
|  | 4 | C | Grinding, R = 2 | None | 1. Grinding, R = 3 2. Zn—Fe alloy coating, t = 6 | Phenolic resin/ graphite A = 60, t = 30 |
|  | 5 | D | 1. Grinding, R = 3 2. Zn—Fe alloy coating, t = 5 | Ti—O/MoS$_2$ A = 50, t = 12 | 1. Grinding, R = 3 2. Zn—Fe alloy coating, t = 5 | Polyamideimide resin/MoS$_2$ A = 80, t = 28 |
|  | 6 | A | 1. Grinding, R = 3 2. Zn phosphating, t = 15 | Ti—O/MoS$_2$ A = 40, t = 10 | Grinding, R = 3 | None |
|  | 7 | A | Grinding, R = 3 | None | 1. Grinding, R = 3 2. Mn phosphating t = 25 | Ti—O/BN A = 10, t = 15 |
|  | 8 | A | Grinding, R = 3 | None | 1. Grinding, R = 3 2. Mn phosphating t = 20 | Polyamideimide resin/PTFE A = 88, t = 30 |
| COMP[2] | 1 | A | Grinding, R = 3 | None | 1. Grinding, R = 3 2. Mn phosphating t = 18 | Polyamideimide resin/MoS$_2$ A = 0, t = 30 |
|  | 2 | A | Grinding, R = 3 | None | 1. Grinding, R = 3 2. Mn phosphating t = 20 | Polyamideimide resin/MoS$_2$ A = 3, t = 28 |
|  | 3 | A | Grinding, R = 3 | None | 1. Grinding, R = 3 2. Mn phosphating t = 22 | Polyamideimide resin/MoS$_2$ A = 95, t = 25 |

(Notes)
[1]ST: Steel Type
[2]COMP = Comparative Examples
"Ti—O" indicates an inorganic polymer having a Ti—O structure.
"R" indicates a surface roughness, Rmax (μm);
"t" indicates the thickness of a coating (μm); and
"A" indicates the proportion (%) of area in cross section of the coating occupied by secondary particles of the lubricating powder having an equivalent diameter of 15–60 μm.

TABLE 3

| Example No. | Occurrence of seizing[1] (at fastening time numbered below) | | | | | | | | | | | | | | |
|---|---|---|---|---|---|---|---|---|---|---|---|---|---|---|---|
| | 6 | 7 | 8 | 9 | 10 | 11 | 12 | 13 | 14 | 15 | 16 | 17 | 18 | 19 | 20 |
| Example 1 | o | o | o | o | o | o | o | o | o | o | o | o | o | Δ | Δ |
| Example 2 | o | o | o | o | o | o | o | o | o | o | o | o | o | o | Δ |
| Example 3 | o | o | o | o | o | o | o | o | o | o | o | o | o | o | Δ |
| Example 4 | o | o | o | o | o | o | o | o | o | o | o | o | o | o | o |
| Example 5 | o | o | o | o | o | o | o | o | o | o | o | o | o | o | o |
| Example 6 | o | o | o | o | o | o | o | o | o | o | o | o | o | o | Δ |
| Example 7 | o | o | o | o | o | o | o | o | o | o | o | Δ | Δ | Δ | Δ |
| Example 8 | o | o | o | o | o | o | o | o | o | o | o | o | o | Δ | Δ |
| Compar. Ex. 1 | o | o | o | Δ | Δ | x | — | — | — | — | — | — | — | — | — |
| Compar. Ex. 2 | o | Δ | Δ | x | — | — | — | — | — | — | — | — | — | — | — |
| Compar. Ex. 3 | Δ | Δ | x | — | — | — | — | — | — | — | — | — | — | — | — |

[1] o No seizing; Δ Slight seizing (repairable); x Severe seizing (unrepairable); — Not performed.

Example 1

A threaded joint made of a carbon steel having the above composition A was subjected to the following surface treatment.

The contact surface of the box was pretreated by sand blasting with #80 sand to have a surface roughness of 10 µm. A solid lubricating coating of a polyamideimide resin containing molybdenum disulfide was formed on that surface to a thickness of 25 µm in the manner described below.

A coating fluid was prepared by adding a polyamideimide resin and a molybdenum disulfide powder having a mean particle diameter of 12 µm to a solvent (ethanol:toluene= 50:50, 65 mass %) in such a proportion that the volume fraction of the powder (the volume fraction as used in this and subsequent examples being the volume fraction of powder based on the total volume of powder and binder) was 80%, followed by stirring and leaving the fluid to stand so as to cause the molybdenum disulfide powder to aggregate. The coating fluid was applied to the contact surface of the box, and the box was then heated in the atmosphere for 30 minutes at 260° C. in a heating furnace to dry and harden the coating and form a solid lubricating coating.

The contact surface of the pin was in an as-machined state produced by grinding (with a surface roughness of 2 µm).

In the following examples, the data shown in Table 2 are not indicated, and Table 2 should be referred to.

Example 2

A threaded joint made of a carbon steel having composition A was subjected to the following surface treatment.

The contact surface of the box was pretreated, after machining, by forming a manganese phosphate chemical conversion coating. A solid lubricating coating of a polyamideimide resin containing molybdenum disulfide was formed on that surface in the same manner as in Example 1.

The coating fluid which was used was prepared by adding a polyamideimide resin and a molybdenum disulfide powder (80% volume fraction) having a mean particle diameter of 3.5 µm to a solvent (ethanol:toluene=50:50, 83 mass %), followed by stirring and leaving the fluid to stand so as to aggregate the molybdenum disulfide powder.

The contact surface of the pin was in an as-machined state formed by grinding.

Example 3

A threaded joint made of a Cr—Mo steel having composition B was subjected to the following surface treatment.

The contact surface of the box was pretreated, after machining, by forming a manganese phosphate chemical conversion coating. A solid lubricating coating of an epoxy resin containing tungsten disulfide was formed on that surface in the same manner as in Example 1 except that the heating temperature was changed to 230° C.

The coating fluid which was used was prepared by adding an epoxy resin and a tungsten disulfide powder (80% volume fraction) having a mean particle diameter of 2.0 µm to a solvent (tetrahydrofuran:cyclohexanone=50:50, 68 mass %), followed by stirring and leaving the fluid to stand so as to aggregate the molybdenum disulfide powder.

The contact surface of the pin was in an as-machined state formed by grinding.

Example 4

A threaded joint made of a 13%-Cr steel having composition C was subjected to the following surface treatment.

The contact surface of the box was pretreated, after machining, by blast plating to form a zinc-iron alloy coating. A solid lubricating coating of a phenolic resin containing graphite was formed on that surface in the same manner as in Example 1 except that the heating temperature was changed to 170° C.

The coating fluid which was used was prepared by adding a phenolic resin and a graphite powder (60% volume fraction) having a mean particle diameter of 1.0 µm to a solvent (N-methyl-2-pyrrolidone:xylene=65:35, 70 mass %), followed by stirring and leaving the fluid to stand so as to aggregate the graphite powder.

The contact surface of the pin was in an as-machined state formed by grinding.

Example 5

A threaded joint made of a high alloy steel having composition D was subjected to the following surface treatment.

The contact surface of the box was pretreated, after machining, by blast plating to form a zinc-iron alloy coating. A solid lubricating coating of a polyamideimide resin containing molybdenum disulfide was formed on that surface in the same manner as in Example 1.

The coating fluid which was used was prepared by adding a polyamideimide resin and a molybdenum disulfide powder (80% volume fraction) having a mean particle diameter of 1.5 µm to a solvent (ethanol:toluene=50:50, 85 mass %), followed by stirring and leaving the fluid to stand so as to aggregate the molybdenum disulfide powder.

The contact surface of the pin was pretreated, after machining, by blast plating to form a zinc coating. A solid lubricating coating of a Ti—O based inorganic polymer containing a molybdenum disulfide powder (with a mean particle diameter of 14 μm) was formed.

The coating fluid which was used was prepared by mixing titanium tetra-isopropoxide as a binder and the above-mentioned lubricating powder with a solvent (xylene:butyl alcohol:cyclohexane=20:10:30, 70 mass %) such that the sum of the amount of the binder as converted to $TiO_2$ and the amount of the powder was 30 mass % (the volume fraction of the lubricating powder being 55% based on the total volume of the binder and the lubricating powder), followed by leaving the fluid to stand so as to aggregate the lubricating powder. Following application of the coating fluid, the resulting coating was left in the atmosphere for 3 hours and then hardened by blowing hot air at 150° C. for 10 minutes.

Example 6

A threaded joint made of a carbon steel having composition A was subjected to the following surface treatment.

The contact surface of the pin was pretreated, after machining, by forming a zinc phosphate chemical conversion coating. A solid lubricating coating of a Ti—O based inorganic polymer containing a molybdenum disulfide powder (with a mean particle diameter of 12 μm) was formed on that surface. The coating fluid was prepared by mixing titanium tetra-isopropoxide as a binder and the above-mentioned lubricating powder with the same solvent as used in Example 5 such that the sum of the amount of the binder as converted to $TiO_2$ and the amount of the powder was 40 mass % (the volume fraction of the lubricating powder being 40% based on the total volume of the binder and the lubricating powder), followed by leaving the fluid to stand so as to aggregate the lubricating powder. The solid lubricating coating was formed on that surface in the same manner as employed in Example 5 to form a lubricating coating on the surface of the pin.

The contact surface of the box was in an as-machined state formed by grinding.

Example 7

A threaded joint made of a carbon steel having composition A was subjected to the following surface treatment.

The contact surface of the box was pretreated, after machining, by forming a manganese phosphate chemical conversion coating. A solid lubricating coating of a Ti—O based inorganic polymer containing a boron nitride powder (with a mean particle diameter of 6 μm) was formed on that surface in the same manner as in Example 6. The coating fluid was prepared by mixing titanium tetra-isopropoxide as a binder and the above-mentioned lubricating powder with the same solvent as used in Example 5 such that the sum of the amount of the binder as converted to $TiO_2$ and the amount of the powder was 30 mass % (the volume fraction of the lubricating powder being 20% based on the total volume of the binder and the lubricating powder), followed by leaving the fluid to stand so as to aggregate the lubricating powder.

The contact surface of the pin was in an as-machined state formed by grinding.

Example 8

A threaded joint made of a carbon steel having composition A was subjected to the following surface treatment.

The contact surface of the box was pretreated, after machining, by forming a manganese phosphate chemical conversion coating. A solid lubricating coating of a polyamideimide resin containing a PTFE powder was formed on that surface in the same manner as in Example 1.

The coating fluid which was used was prepared by adding a polyamideimide resin and a PTFE powder (with a mean particle diameter of 1.0 μm) (90% volume fraction) to a solvent (ethanol:toluene=50:50, 85 mass %), followed by stirring and leaving the fluid to stand so as to aggregate the PTFE powder.

The contact surface of the pin was in an as-machined state formed by grinding.

As shown in Table 3, when the threaded joints illustrated in the above Examples 1–8 were subjected to a test in which fastening and loosening were repeated 20 times, slight seizing occurred in some examples in the 18th and later runs, but even in such cases, fastening and loosening could be repeated 20 times with surface dressing.

Comparative Example 1

A threaded joint made of a carbon steel having composition A was subjected to the following surface treatment.

The contact surface of the box was pretreated, after machining, by forming a manganese phosphate chemical conversion coating. A solid lubricating coating of a polyamideimide resin containing molybdenum disulfide (A=0%) was formed on that surface in the same manner as in Example 1.

The coating fluid was prepared by adding a polyamideimide resin and a molybdenum disulfide powder (80% volume fraction) having a mean particle diameter of 3.2 μm to a solvent (ethanol:toluene=50:50, 50 mass %) followed by thorough stirring, and it was immediately used without leaving it to stand so as to prevent the molybdenum disulfide powder from aggregating.

The contact surface of the pin was in an as-machined state formed by grinding.

As shown in Table 3, in the fastening and loosening test, no seizing occurred until fastening and loosening were repeated 8 times. However, in the 9th and 10th runs, slight seizing occurred, and surface dressing was carried out to continue the test. Finally, in the 11th run, severe seizing occurred, and the test was terminated.

Comparative Example 2

A threaded joint made of a carbon steel having composition A was subjected to the following surface treatment.

The contact surface of the box was pretreated, after machining, by forming a manganese phosphate chemical conversion coating. A solid lubricating coating of a polyamideimide resin containing molybdenum disulfide (A=3%) was formed on that surface in the same manner as in Example 1.

The coating fluid which was used was prepared by adding a polyamideimide resin and a molybdenum disulfide powder (5% volume fraction) having a mean particle diameter of 4.0 μm to a solvent (ethanol:toluene=50:50, 28 mass %), followed by stirring and leaving the fluid to stand so as to aggregate the molybdenum disulfide powder.

The contact surface of the pin was in an as-machined state formed by grinding.

As shown in Table 3, in the fastening and loosening test, no seizing occurred until fastening and loosening were repeated 6 times. However, in the 7th and 8th runs, slight seizing occurred, and surface dressing was carried out to continue the test. Finally, in the 9th run, severe seizing occurred, and the test was terminated. Due to the fact that the proportion of area occupied by molybdenum disulfide having an equivalent diameter of 15–60 μm was as small as 3%, the galling resistance was insufficient.

Comparative Example 3

A threaded joint made of a carbon steel having composition A was subjected to the following surface treatment.

The contact surface of the box was pretreated, after machining, by forming a manganese phosphate chemical conversion coating. A solid lubricating coating of a polyamideimide resin containing molybdenum disulfide (A=95%) was formed on that surface in the same manner as in Example 1.

The coating fluid which was used was prepared by adding a polyamideimide resin and a molybdenum disulfide powder (95% volume fraction) having a mean particle diameter of 7.0 μm to a solvent (ethanol:toluene=50:50, 80 mass %), followed by stirring and leaving the fluid to stand so as to aggregate the molybdenum disulfide powder.

The contact surface of the pin was in an as-machined state formed by grinding.

As shown in Table 3, in the fastening and loosening test, no seizing occurred until fastening and loosening were repeated 5 times. However, in the 6th and 7th runs, slight seizing occurred, and surface dressing was carried out to continue the test. Finally, in the 8th run, severe seizing occurred, and the test was terminated. The proportion of area occupied by molybdenum disulfide having an equivalent diameter of 15–60 μm which was as large as 95% seems to cause the strength and adhesion of the solid lubricating coating to greatly decrease, leading to insufficient galling resistance.

Examples 9–17 and Comparative Examples 4–5

These examples illustrate the second embodiment of the present invention.

The contact surface of each of the pin and the box of a threaded joint for steel pipes (outer diameter: 7 inches, wall thickness: 0.408 inches) made of a material selected from a carbon steel A, a Cr—Mo steel B, a 13%-Cr steel C, and a high alloy steel D each having a composition shown in the foregoing Table 1 were subjected to is the surface treatment (surface pretreatment and formation of a solid lubricating coating, if any) shown in Table 4. The coating fluid which was used to form each solid lubricating coating composition was prepared by stirring together the constituents to disperse a powder and was immediately used for coating.

Table 4 shows the data on the pretreatment, i.e., the surface roughness in Rmax (R) of the substrate steel and the thickness of a primary coat layer (t), for each of the pin and the box, as well as the constitution of a solid lubricating coating, i.e., the particular binder, lubricating powder, and fibrous filler used, the mass ratio of lubricating powder to binder (M) and the mass ratio of fibrous filler to binder (F) in the coating, the cross-sectional diameter of the fibrous filler (D), and the thickness of the lubricating coating (t) formed on the pretreated surface of the pin and/or box.

The mean particle diameter of each lubricating powder used was as follows:

| | |
|---|---|
| Molybdenum disulfide powder ($MoS_2$): | 15 μm |
| Tungsten disulfide powder ($WS_2$): | 4 μm |
| Graphite powder: | 1 μm |
| Boron nitride powder (BN): | 2 μm |
| PTFE powder: | 0.8 μm. |

Using a threaded joint in which the pin and box had been treated as described above, a fastening and loosening test was carried out with a fastening speed of 10 rpm and a fastening torque of 10340 ft-lbs. After the threaded joint was initially fastened at ambient temperature, it was heated for 24 hours at 250° C. and then allowed to cool to ambient temperature before loosening (unfastening) was performed. The operation of fastening→heating→allowing to cool→loosening was repeated 10 times while examining the occurrence of seizing or galling. Table 5 show the results of occurrence of seizing.

A commercially available, ordinary rust-preventing oil which did not contain heavy metal powder was applied to the contact surface of the pin or box on which a solid lubricating coating was not formed, in order to prevent the surface from rusting. The fastening and loosening test was carried out without removing the rust-preventing oil.

TABLE 4

| | | | Pin | | Box | |
|---|---|---|---|---|---|---|
| TYPE | No. | $ST^1$ | Pretreatment | Lubricating Coating | Pretreatment | Lubricating Coating |
| EXAMPLES | 9 | A | Grinding, R = 2 | None | Sand blasting, R = 10 | PAI resin[3], t = 25<br>$MoS_2$ (M = 4)<br>K—TiO[4] (F = 0.1, D = 0.2) |
| | 10 | A | Grinding, R = 2 | None | 1. Grinding, R = 2<br>2. Mn phosphating, t = 25 | PAI resin, t = 25<br>$MoS_2$ (M = 4)<br>ZnO (F = 0.05, D = 3.0) |
| | 11 | B | 1. Grinding, R = 3<br>2. Zn phosphating, t = 15 | None | 1. Grinding, R = 3<br>2. Mn phosphating, t = 20 | Epoxy resin, t = 20<br>$WS_2$ (M = 1.5); Al borate (F = 0.15, D = 1.0) |
| | 12 | C | Grinding, R = 2 | None | 1. Grinding, R = 3<br>2. Cu plating, t = 6 | Phonolic resin, t = 3<br>$MoS_2$ + graphite (M = 1.0)<br>SiC (F = 0.3, D = 1.5) |
| | 13 | D | 1. Grinding, R = 3,<br>2. Zn—Fe alloy | PAI resin, t = 25<br>$MoS_2$ (M = 4) | 1. Grinding, R = 3<br>2. Zn—Fe alloy | PAI resin, t = 28<br>$MoS_2$ (M = 4) |

TABLE 4-continued

| TYPE | No. | ST[1] | Pin Pretreatment | Pin Lubricating Coating | Box Pretreatment | Box Lubricating Coating |
|---|---|---|---|---|---|---|
| | | | coat, t = 6 | K—TiO (F = 0.1, D = 0.2) | coating, t = 5 | $Si_3N_4$ (F = 0.48, D = 0.6) |
| | 14 | A | 1. Grinding, R = 3<br>2. Zn phosphating, t = 15 | PAI resin, t = 30<br>$MoS_2$ (M = 3)<br>Carbon fibers<br>F = 0.08, D = 18) | 1. Grinding, R = 3<br>2. Mn phosphating, t = 20 | None |
| | 15 | A | Grinding, R = 3 | None | 1. Grinding, R = 3<br>2. Mn phosphating, t = 21 | PAI resin, t = 32<br>$MoS_2$ (M = 3); Cu fibers<br>(F = 0.02, D = 13) |
| | 16 | A | Grinding, R = 3 | None | 1. Grinding, R = 3<br>2. Mn phosphating, t = 18 | PAI resin, t = 28<br>$MoS_2$ (M = 4); Ca silicate (F = 0.1, D = 0.05) |
| | 17 | A | Grinding, R = 3 | None | 1. Grinding, R = 3<br>2. Mn phosphating, t = 16 | PAI resin, t = 33<br>$MoS_2$ (M = 4); glass fibers (F = 0.12, D = 35) |
| COMP[2] | 4 | A | Grinding, R = 3 | None | 1. Grinding, R = 3<br>2. Mn phosphating, t = 18 | PAI resin, t = 28<br>$MoS_2$ (M = 4) |
| | 5 | A | Grinding, R = 2 | None | 1. Grinding, R = 3<br>2. Mn phosphating, t = 18 | PAI resin, t = 28<br>$MoS_2$ (M = 4)<br>K—TiO (F = 0.8, D = 0.2) |

Notes
[1]ST Steel Type;
[2]COMP = Comparative Examples
[3]PAI resin = Polyamideimide resin;
[4]K—TiO = Potassium titanate
R indicates a surface roughness, Rmax ($\mu$m);
t indicates the thickness of a coating ($\mu$m);
M indicates the mass ratio of lubricating powder to binder;
F indicates the mass ratio of fibrous filler to binder; and
D indicates the cross-sectional diameter of fibrous filler.

TABLE 5

| Example No. | Occurrence of seizing[1] (at fastening time numbered below) | | | | | | | | | |
|---|---|---|---|---|---|---|---|---|---|---|
| | 1 | 2 | 3 | 4 | 5 | 6 | 7 | 8 | 9 | 10 |
| Example 9 | ○ | ○ | ○ | ○ | ○ | ○ | ○ | ○ | ○ | ○ |
| Example 10 | ○ | ○ | ○ | ○ | ○ | ○ | ○ | ○ | ○ | ○ |
| Example 11 | ○ | ○ | ○ | ○ | ○ | ○ | ○ | ○ | ○ | ○ |
| Example 12 | ○ | ○ | ○ | ○ | ○ | ○ | ○ | ○ | ○ | ○ |
| Example 13 | ○ | ○ | ○ | ○ | ○ | ○ | ○ | ○ | ○ | ○ |
| Example 14 | ○ | ○ | ○ | ○ | ○ | ○ | ○ | ○ | Δ | Δ |
| Example 15 | ○ | ○ | ○ | ○ | ○ | ○ | ○ | ○ | Δ | Δ |
| Example 16 | ○ | ○ | ○ | ○ | ○ | ○ | Δ | Δ | Δ | Δ |
| Example 17 | ○ | ○ | ○ | ○ | ○ | ○ | Δ | Δ | Δ | Δ |
| Compar. Ex. 4 | Δ | x | — | — | — | — | — | — | — | — |
| Compar. Ex. 5 | ○ | Δ | Δ | x | — | — | — | — | — | — |

[1]
○ No seizing;
Δ Slight seizing (repairable);
x Severe seizing (unrepairable);
— Not performed.

Example 9

A threaded joint made of a carbon steel having composition A was subjected to the following surface treatment.

The contact surface of the box was pretreated by sand blasting with #80 sand to have a surface roughness of 10 $\mu$m. A solid lubricating coating of a polyamideimide resin containing a molybdenum disulfide powder and acicular, single-crystal whiskers of potassium titanate ($K_2O \cdot 6TiO_2$) was formed on that surface. As shown in Table 4, the whiskers had a cross-sectional diameter of 0.2 $\mu$m, the thickness of the solid lubricating coating was 25 $\mu$m, and the solid lubricating coating contained the molybdenum disulfide powder as a lubricating powder and the potassium titanate whiskers as a fibrous filler with mass ratios of 4 and 0.1, respectively, relative to the mass of the polyamideimide. The solid lubricating coating was subjected to post-treatment for hardening by heating for 30 minutes at 260° C.

The contact surface of the pin was in an as-machined state produced by grinding.

In the following examples, the data shown in Table 4 are not indicated, and Table 4 should be referred to.

Example 10

A threaded joint made of a carbon steel having composition A was subjected to the following surface treatment.

The box surface was pretreated, after machining, by forming a manganese phosphate chemical conversion coating thereon. A solid lubricating coating of a polyamideimide resin containing a molybdenum disulfide powder and acicular, single-crystal whiskers of zinc oxide (ZnO) was formed on that surface in the same manner as in Example 9.

The pin surface was in an as-machined state produced by grinding.

Example 11

A threaded joint made of a Cr—Mo steel having composition B was subjected to the following surface treatment.

The box surface was pretreated, after machining, by forming a manganese phosphate chemical conversion coating thereon. A solid lubricating coating of an epoxy resin containing a tungsten disulfide powder and acicular, single-crystal whiskers of aluminum borate ($9Al_2O_3 \cdot 2B_2O_3$) was formed on that surface in the same manner as in Example 9 except that the heating temperature was changed to 230° C.

The pin surface was pretreated, after machining, by forming a zinc phosphate chemical conversion coating.

Example 12

A threaded joint made of a 13%-Cr steel having composition C was subjected to the following surface treatment.

The box surface was pretreated, after machining, by electroplating to form a copper plated coating. A solid lubricating coating of a phenolic resin containing a molybdenum disulfide powder, a graphite powder, and acicular, single-crystal whiskers of silicon carbide (SiC) was formed on that surface in the same manner as in Example 9 except that the heating temperature was changed to 170° C.

The pin surface was in an as-machined state produced by grinding.

Example 13

A threaded joint made of a high alloy steel having composition D was subjected to the following surface treatment.

The box surface was pretreated, after machining, by blast plating to form a zinc-iron alloy coating. A solid lubricating coating of a polyamideimide resin containing a molybdenum disulfide powder and whiskers of silicon nitride ($Si_3N_4$) was formed on that surface in the same manner as in Example 9.

The pin surface was pretreated, after machining, by blast plating to form a zinc-iron alloy coating. A solid lubricating coating of a polyamideimide resin containing a molybdenum disulfide powder and acicular, single-crystal whiskers of potassium titanate was formed on that surface in the same manner as in Example 9.

Example 14

A threaded joint made of a carbon steel having composition A was subjected to the following surface treatment.

The pin surface was pretreated, after machining, by forming a zinc phosphate chemical conversion coating thereon. A solid lubricating coating of a polyamideimide resin containing a molybdenum disulfide powder and carbon fibers of about 30 μm long was formed on that surface in the same manner as in Example 9.

The box surface was pretreated, after machining, by forming a manganese phosphate chemical conversion coating thereon.

Example 15

A threaded joint made of a carbon steel having composition A was subjected to the following surface treatment.

The box surface was pretreated, after machining, by forming a manganese phosphate chemical conversion coating thereon. A solid lubricating coating of a polyamideimide resin containing a molybdenum disulfide powder and copper fibers of about 80 μm long was formed on that surface in the same manner as in Example 9.

The pin surface was in an as-machined state produced by grinding.

Example 16

A threaded joint made of a carbon steel having composition A was subjected to the following surface treatment.

The box surface was pretreated, after machining, by forming a manganese phosphate chemical conversion coating thereon. A solid lubricating coating of a polyamideimide resin containing a molybdenum disulfide powder and whiskers of calcium silicate ($CaSiO_3$) was formed on that surface in the same manner as in Example 9.

The pin surface was in an as-machined state produced by grinding.

Example 17

A threaded joint made of a carbon steel having composition A was subjected to the following surface treatment.

The box surface was pretreated, after machining, by forming a manganese phosphate chemical conversion coating thereon. A solid lubricating coating of a polyamideimide resin containing a molybdenum disulfide powder and of quartz ($SiO_2$) glass fibers of 100 μm long was formed on that surface in the same manner as in Example 9.

The pin surface was in an as-machined state produced by grinding.

As shown in Table 5, when the threaded joints illustrated in Examples 9–17 were subjected to fastening and loosening 10 times under conditions which simulated a high-temperature oil well, slight seizing occurred in some examples after fastening and loosening were repeated 7 times, but even in such cases, fastening and loosening could be repeated 10 times by surface dressing. In Example 16 in which the cross-sectional diameter of the fibrous filler was as small as 0.05 μm and in Example 17 in which the cross-sectional diameter of the fibrous filler was as large as 35 μm, abrasion resistance at high temperatures was somewhat decreased, but even in these examples, a significant effect on preventing galling is noted when compared to the following conventional example (Comparative Example 4).

Comparative Example 4

A threaded joint made of a carbon steel having composition A was subjected to the following surface treatment.

The box surface was pretreated, after machining, by forming a manganese phosphate chemical conversion coating thereon. A solid lubricating coating of a polyamideimide resin containing a molybdenum disulfide powder but not containing any fibrous filler (no fibrous filler being present) was formed on that surface in the same manner as in Example 9.

The pin surface was in an as-machined state produced by grinding.

As shown in Table 5, when fastening and loosening were repeated ten times, slight seizing occurred in the first run. Fastening and loosening were continued after surface dressing, but in the second run, severe seizing occurred, so the test was terminated.

Comparative Example 5

A threaded joint made of a carbon steel having composition A was subjected to the following surface treatment.

The box surface was pretreated, after machining, by forming a manganese phosphate chemical conversion coating thereon. A solid lubricating coating of a polyarnideimide resin containing a molybdenum disulfide powder and acicular, single-crystal whiskers of potassium titanate (potassium titanate as a fibrous filler being present in an excess amount) was formed on that surface in the same manner as in Example 9.

The pin surface was in an as-machined state produced by grinding.

As shown in Table 5, when fastening and loosening were repeated ten times, slight seizing occurred in the second run.

By performing surface dressing, fastening and loosening could be continued until the third run, but in the fourth run, severe seizing occurred, so the test was terminated.

What is claimed is:

1. A threaded joint for steel pipes comprising a pin and a box each having a contact surface including a threaded portion and an unthreaded metal contact portion, characterized in that the contact surface of at least one of the pin and the box has a solid lubricating coating comprising a lubricating powder and a binder, wherein the proportion of area of a cross section along the thickness of the solid lubricating coating which is occupied by secondary particles of the lubricating powder having an equivalent circular diameter of 15–60 μm is from 5% to 90%.

2. A threaded joint for steel pipes comprising a pin and a box each having a contact surface including a threaded portion and an unthreaded metal contact portion, characterized in that the contact surface of at least one of the pin and the box has a solid lubricating coating comprising a lubricating powder, a fibrous filler, and a binder in which the mass ratio of the fibrous filler to the binder is in the range of from 0.01 to 0.5.

3. A threaded joint as set forth in claim 1, wherein the lubricating powder is powder of one or more substances selected from molybdenum disulfide, tungsten disulfide, organomolybdenum compounds, graphite, boron nitride, and polytetrafluoroethylene.

4. A threaded joint as set forth in claim 1, wherein the binder is an organic resin or an inorganic polymer.

5. A threaded joint as set forth in claim 2, wherein the ribrous fillers is in the form of fibers of one or more materials selected from potassium titanate, zinc oxide, aluminum borate, silicon carbide, and silicon nitride.

6. A threaded joint as set forth in claim 1, wherein the contact surface having the solid lubricating coating has a surface roughness of 5–40 μm Rmax.

7. A threaded joint as set forth in claim 1, wherein a porous coating layer is disposed as a primary coat between the solid lubricating coating and the contact surface.

8. A threaded joint as set forth in claim 7, wherein the porous coating layer is a phosphate chemical conversion coating or a coating of zinc or a zinc alloy.

9. A threaded joint as set forth in claim 1, wherein the secondary particles are aggregates of primary particles having a mean particle diameter of 0.5–15 μm.

10. A threaded joint as set forth in claim 2, wherein the lubricating powder is powder of one or more substances selected from molybdenum disulfide, tungsten disulfide, organomolybdenum compounds, graphite, boron nitride, and polytetrafluoroethylene.

11. A threaded joint as set forth in claim 2, wherein the binder is an organic resin or an inorganic polymer.

12. A threaded joint as set forth in claim 2, wherein the contact surface having the solid lubricating coating has a surface roughness of 5–40 μm Rmax.

13. A threaded joint as set forth in claim 2, wherein a porous coating layer is disposed as a primary coat between the solid lubricating coating and the contact surface.

* * * * *